Sept. 12, 1961     E. STUMP     2,999,682
PNEUMATIC SPRING SYSTEM FOR MOTOR VEHICLES
Filed Sept. 16, 1957
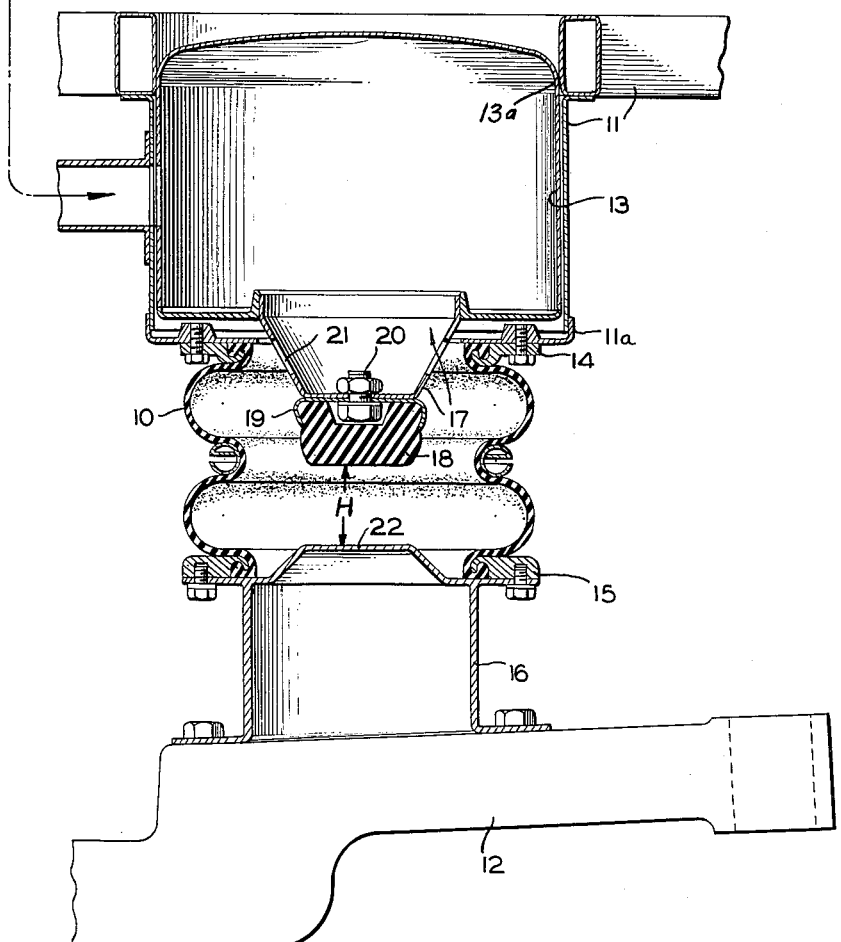
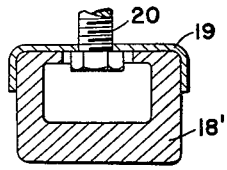
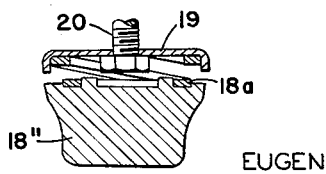
INVENTOR
EUGEN STUMP
BY *Dicke and Craig*
ATTORNEYS.

United States Patent Office 2,999,682
Patented Sept. 12, 1961

2,999,682
PNEUMATIC SPRING SYSTEM FOR MOTOR VEHICLES
Eugen Stump, Stuttgart-Unterturkheim, Germany, assignor to Daimler-Benz Aktiengesellschaft, Stuttgart-Unterturkheim, Germany
Filed Sept. 16, 1957, Ser. No. 684,006
Claims priority, application Germany Sept. 19, 1956
5 Claims. (Cl. 267—65)

The present invention relates to a pneumatic spring system, especially for heavy-duty vehicles, such as trucks, comprising a spring housing consisting of a rubber bellows which is preferably in continuous communication with an air reservoir or tank supplied, for example, by an air compressor of suitable construction, as disclosed in my copending application Serial No. 684,007, filed September 16, 1957, and entitled "Pneumatic Spring System for Heavy-Duty Motor Vehicles."

The present invention aims primarily at an increase in the driving safety combined with a particularly advantageous constructional arrangement of the installation provided therefor.

The present invention essentially consists therein that an elastic buffer is arranged within the pneumatic spring body, especially within a spring bellows, for limiting the spring stroke of the parts which are spring-supported against each other and undergo relative spring movements. The use of such a construction enables the attainment of the advantage that, aside from the limitation of the spring stroke during excessive shocks, in case of lack or complete absence of the pneumatic medium such as pressurized air, for example, due to leaks in the spring system, the parts springily supported with respect to each other abut relatively softly against each other by means of the elastic buffer. Shocks which would otherwise endanger the vehicle may thereby be avoided. Furthermore, the vehicle may also continue its travel, in that case, provided the necessary precautions are taken during continued travel.

Furthermore, by locating the elastic buffer within the pneumatic spring body formed by the bellows, the elastic buffer is protected on the outside thereof against damages by being completely surrounded and shielded by means of the spring bellows.

Preferably the rubber buffer is secured at a suitable support member which is arranged, for example, at the air tank or reservoir and is provided with apertures which directly connect the interior of the pneumatic spring body, for example, of the spring bellows, with the interior of the air tank or reservoir. Preferably, rubber or a corresponding noise-absorbing elastomeric material is selected as the elastic material for the buffer.

Accordingly, it is an object of the present invention to provide a pneumatic spring suspension which increases the operational safety thereof, particularly against the hazards of lack of pressurized air.

It is still another object of the present invention to provide a pneumatic spring system, and more particularly an arrangement of the pneumatic spring system which prevents damage to the spring system as well as to the vehicle during the absence of pressurized medium ordinarily present in the pneumatic spring system.

Still another object of the present invention resides in the provision of an elastic member within the pneumatic spring system which resiliently absorbs shock or the like in the absence of the pressurized medium for the pneumatic spring system.

Still another object of the present invention resides in the provision of an elastic buffer arranged within the spring bellows of the pneumatic system so as to protect the elastic buffer against damages from the outside.

These and other object, features and advantages of the present invention will become more obvious from the following description when taken in connection with the accompanying drawings in which:

FIGURE 1 is a partial cross-sectional view of one embodiment of a pneumatic spring system in accordance with the pesent invention;

FIGURE 2 is a sectional view of a modified sealed hollow elastic buffer which may be substituted for a corresponding structure in FIGURE 1; and FIGURE 3 is a modified elastic buffer also for substitution for a corresponding part in FIGURE 1 but utilizing an additional resilient spring element.

Referring now more particularly to FIGURE 1 of the drawing, which shows a partial cross-sectional view through a spring system in accordance with the present invention, for example, of the front axle of a truck, reference numeral 10 designates therein the pneumatic spring body constituted by the spring bellows which may be made of any suitable material. The spring bellows 10 of the pneumatic spring system is connected, on the one hand, to the frame 11 of the vehicle, and, on the other, to the axle member 12 carrying the wheels of the vehicle. Such connection between the spring bellows 10 and the frame 11, on the one hand, and the spring bellows 10 and the axle member 12, on the other, may be made either directly or indirectly by the interposition of suitable connecting means, the frame 11 and the axle member 12 thereby constituting two parts spring supported against each other by the pneumatic spring 10.

An air reservoir or tank 13, which, for example, is connected with a compressor of suitable construction and adapted to maintain constant the air pressure therein, is arranged immediately adjoining the bellows 10 and generally coaxial with the latter at the upper spring abutment member 11a with which the upper end of the spring bellows 10 is rigidly connected in any conventional manner known, for example, by means of securing rings, lamps 14 or the like. In a corresponding manner, the lower end of the spring bellows 10 is connected by means of a securing element 15 with a mount 16 secured to the axle member 12. The tank is of large volume relative to the bellows to provide a total combined volume substantially greater than that of the bellows alone.

A support member 17, for instance, of truncated conical shape, is rigidly secured, for example, by welding, within the spring bellows 10, for example, at the spring abutment member 11a or at the air tank 13. Similarly, the abutment member 11a and the air tank 13 are rigidly secured, for example, by welding, to the frame 11, the point of securing of the air tank to the frame being indicated at 13a in the drawings. The support member 17 defines a wall structure separating the interior of the bellows 10 from the interior of the reservoir tank 13 and carries the rubber buffer 18, of any suitable elastomeric material, which itself serves the purpose of limiting the relative spring movements of the two parts 11 and 12, usually the upward stroke of the axle member 12 with respect to the frame 11. The rubber buffer 18 is reinforced by means of a metallic disk 19 made, for example, of steel, and, in particular, is securely connected therewith, for example, by vulcanization thereto. A bolt 20 serves for securing the disk 19 together with the rubber buffer 18 to the support member 17. Apertures 21 of fixed dimensions provided in the support member 17 permit free and uncontrolled passage of air from the interior of the bellows 10 into the interior of the air tank 13 and vice versa.

After the wheel axle member 12 reaches the maximum spring stroke H or during failure of the pneumatic spring system, the rubber buffer 18 abuts within the interior of the spring bellows 10 against a counter-abutment surface formed by an embossment 22 of the mount 16 secured to the axle member 12, whereby the relative spring movements, i.e., the upward stroke of the wheel axle member 12 in the direction toward frame 11 is elastically limited.

The rubber buffer 18 may have any suitable shape, for example, may be of cylindrical or conical shape, or may also possibly be in the shape of a truncated pyramid.

Furthermore, solid or hollow rubber bodies 18 may be used, for example, in such a manner that the hollow space formed within a hollow buffer 18 is securely sealed toward the outside thereof.

Furthermore, the elastic buffer 18 may also be arranged at the axle member 12 instead of at the frame 11. Moreover, the rubber buffer 18 may be connected with that part of the vehicle carrying the same, for example, with the frame or the axle, by means of an additional spring member, for example, by means of a coil spring, in order to further soften the impacts occurring during abutment of the rubber buffer 18 against the counter-abutment surface 22 thereof.

While I have shown and described one embodiment in accordance with the present invention, it is understood that the same is not limited thereto but is susceptible of many changes and modifications within the spirit of the present invention, and I intend to cover all such changes and modifications as encompassed by the appended claims.

I claim:

1. A pneumatic spring system, especially for heavy-duty motor vehicles, comprising a frame member and an axle member movable relative to one another, pneumatic means suspending said frame member on said axle member including spring bellows and a relatively rigid reservoir tank for a pneumatic medium located between said two members, said reservoir tank being rigidly secured to said frame member and disposed outside of, but immediately adjacent to, the spring bellows, an apertured support means rigidly secured to said tank at one end of said bellows and defining a wall between the interiors of said spring bellows and said tank and having at least one large aperture providing free passage therethrough in both directions at all times of pressurized pneumatic medium between all parts of said interiors, said tank being of large volume relative to said bellows to provide in combination with said bellows a pressure medium chamber of a total volume substantially greater than the volume of said bellows, means for maintaining a pneumatic medium under pressure in said interiors, said apertured support means projecting into said bellows and providing a central abutment surface facing the interior of said bellows, means rigidly secured to said axle member at the other end of said bellows also defining a central abutment surface facing said first mentioned abutment surface, and elastomeric buffer means secured to one of said abutment surfaces within the interior of said bellows and engageable with the other abutment surface to provide a cushion for limiting the spring movement of said two members with respect to each other, said aperture providing a substantially unimpeded passage between said interiors when said buffer means and said other abutment surface are in engagement.

2. A pneumatic spring system according to claim 1, wherein said means for maintaining a pneumatic medium under pressure in the interiors of said spring bellows and said tank includes a compressor and means connecting said compressor to supply the pneumatic medium to said interiors.

3. A pneumatic spring system according to claim 1, wherein said elastomeric buffer means includes a metallic disk, an elastomeric buffer vulcanized to said disk, and bolt means for connecting said disk to said one abutment surface.

4. A pneumatic spring system according to claim 1, wherein said elastomeric buffer means is formed as a hollow body of which the hollow space is sealed toward the outside.

5. A pneumatic spring system according to claim 1, wherein said elastomeric buffer means includes an elastomeric buffer and further comprises spring means intermediate said elastomeric buffer and said one abutment surface to spring support said elastomeric buffer against said one abutment surface.

References Cited in the file of this patent

UNITED STATES PATENTS

| 67,897 | Miller | Aug. 20, 1867 |
| 2,115,072 | Hunt et al. | Apr. 26, 1938 |
| 2,411,852 | Domine | Dec. 3, 1946 |
| 2,466,384 | Cook | Apr. 5, 1949 |
| 2,496,893 | Smith | Feb. 7, 1950 |
| 2,537,637 | Candlin et al. | Jan. 9, 1951 |
| 2,842,359 | Auer | July 8, 1958 |

FOREIGN PATENTS

| 537,632 | Italy | Jan. 2, 1956 |
| Ser. No. M24,679 | Germany | Oct. 31, 1956 |